(12) United States Patent
Iwamatsu et al.

(10) Patent No.: US 6,274,208 B1
(45) Date of Patent: *Aug. 14, 2001

(54) LIQUID CRYSTAL COMPOSITION AND LIQUID CRYSTAL DISPLAY DEVICE

(75) Inventors: Masako Iwamatsu, Toyonaka; Nobuyuki Kobayashi, Kobe; Hideaki Ueda, Kishiwada, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/370,709

(22) Filed: Aug. 9, 1999

(30) Foreign Application Priority Data

Aug. 18, 1998 (JP) .................................................. 10-231923

(51) Int. Cl.$^7$ .......................... C09K 19/52; C09K 19/20; C09K 19/30; G02F 1/1333

(52) U.S. Cl. ................ 428/1.1; 252/299.01; 252/299.63; 252/299.66; 252/299.67; 349/35; 349/169

(58) Field of Search .................... 252/299.01, 299.63, 252/299.66, 299.67, 299.7; 428/1.1; 349/169, 35

(56) References Cited

U.S. PATENT DOCUMENTS

| | | | |
|---|---|---|---|
| 5,384,067 | 1/1995 | Doane et al. | 252/299.01 |
| 5,437,811 | 8/1995 | Doane et al. | 252/299.01 |
| 5,453,863 | 9/1995 | West et al. | 359/91 |
| 5,656,198 | * 8/1997 | Naito et al. | 252/299.01 |
| 5,762,825 | * 6/1998 | Tsubata et al. | 252/299.6 |
| 5,766,518 | * 6/1998 | Ishii | 252/582 |
| 5,866,035 | * 2/1999 | Sekine et al. | 252/299.6 |
| 5,972,244 | * 10/1999 | Naito et al. | 252/299.67 |

FOREIGN PATENT DOCUMENTS

| | | |
|---|---|---|
| 5-224187 | 9/1993 | (JP) . |
| 5-241119 | 9/1993 | (JP) . |
| 6-222320 | * 8/1994 | (JP) . |
| 6-507505 | 8/1994 | (JP) . |
| 7-234394 | * 9/1995 | (JP) . |
| WO9219695 | 11/1992 | (WO) . |

OTHER PUBLICATIONS

Caplus 1995: 498303.*

* cited by examiner

Primary Examiner—Shean C. Wu
(74) Attorney, Agent, or Firm—Sidley & Austin

(57) ABSTRACT

A liquid crystal composition which contains a liquid crystal tolan compound, a liquid crystal ester compound, a liquid crystal phenylcyclohexane compound and at least one chiral agent. A reflective type liquid crystal display has the liquid crystal composition and a columnar structure between substrates with ITO electrodes thereon.

18 Claims, 2 Drawing Sheets

FIG. 1
FIG. 1a
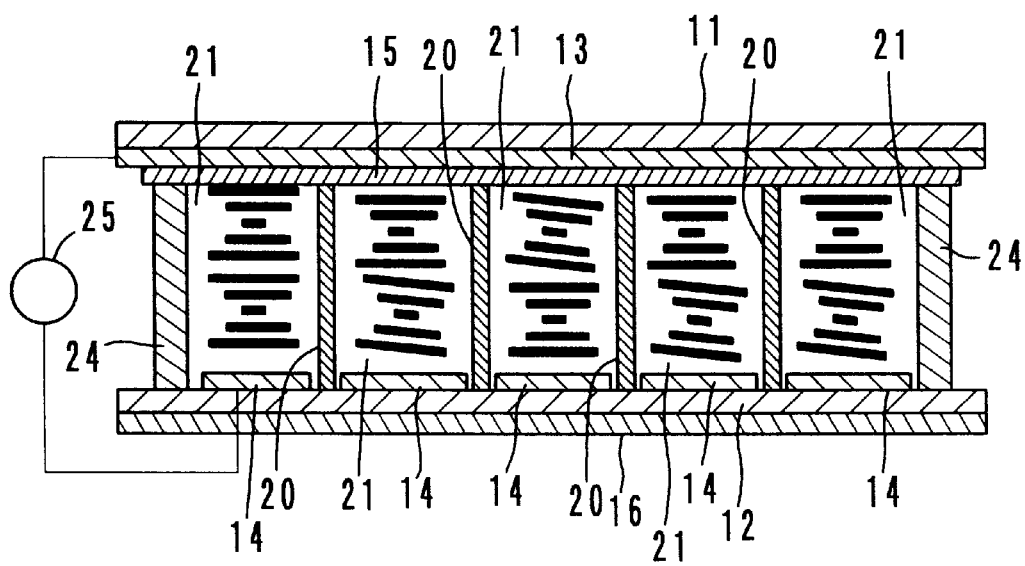
FIG. 1b
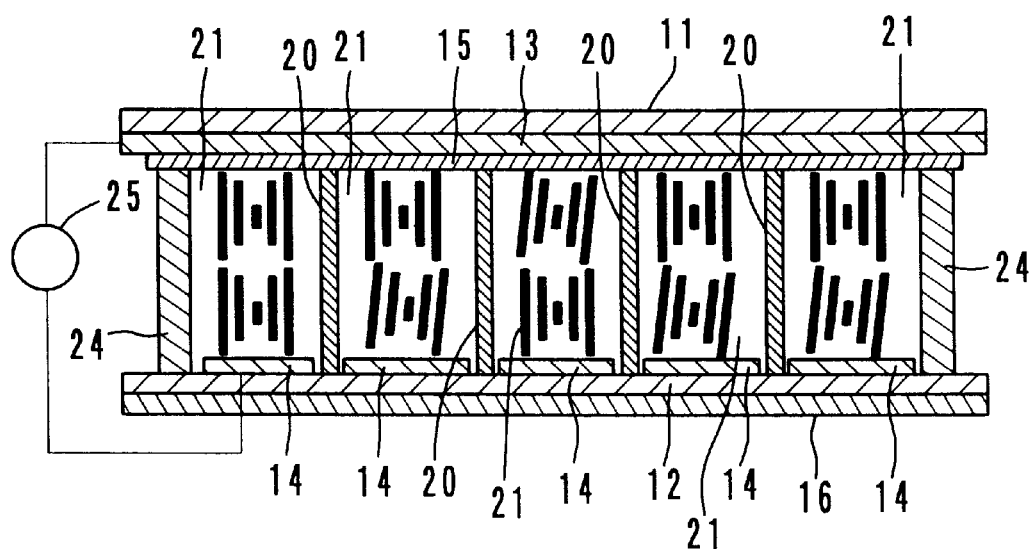

LIQUID CRYSTAL COMPOSITION AND LIQUID CRYSTAL DISPLAY DEVICE

This application is based on application No. 10-231923 filed in Japan, the contents of which is hereby incorporated by reference.

BACKGROUND OF THE INVENTION

1. Field of the Invention

The present invention relates to a liquid crystal composition which exhibits a cholesteric phase at room temperature and a bistable/reflective type liquid crystal display device provided with the liquid crystal composition.

2. Description of Related Art

Recently, studies have been made to develop reflective liquid crystal displays by using chiral nematic liquid crystal which is produced by adding a chiral agent to nematic liquid crystal to cause the liquid crystal to exhibit a cholesteric phase at room temperature. Such a liquid crystal display operates by switching between a planar state and a focal-conic state in accordance with the level of the pulse voltage applied thereto. The planar state and the focal-conic state can be maintained after the application of the pulse voltage (which is referred to as bistability or non-volatility), whereby the display can be maintained even after stoppage of the application of the voltage.

At present, however, in such a reflective liquid crystal display, the reflectance is low, and the contrast between the planar state and the focal-conic state is not sufficiently high, and liquid crystal displays of this type which are satisfactory in performance such as color purity (excitation purity), etc. are yet to be developed. To this type of liquid crystal displays, it is also important to have a wide temperature compensation range.

SUMMARY OF THE INVENTION

It is an object of the present invention to provide a liquid crystal composition which, when used for a liquid crystal display device, has good bistability, color purity, reflectance, etc. and has high contrast.

Another object of the present invention is to provide a liquid crystal composition which, when used for a liquid crystal display device, has a wide temperature compensation range.

Another object of the present invention is to provide a liquid crystal display device which has good bistability, color purity, reflectance, etc. and has high contrast.

Further, another object of the present invention is to provide a liquid crystal display device which has a wide temperature compensation range.

In order to attain the objects, a liquid crystal composition according to the present invention is a chiral nematic liquid crystal composition which contains a liquid crystal tolan compound, a liquid crystal ester compound, a liquid crystal phenylcyclohexane compound and a chiral agent.

Also, a liquid crystal display device according to the present invention comprises a pair of substrates, at least one of which is transparent, the above mentioned liquid crystal composition provided between the substrates, and a device for applying an electric field to the liquid crystal composition.

By using the liquid crystal composition, the characteristics such as color purity, reflectance, etc. can be improved, and a display with high contrast becomes possible. Also, if a plurality of chiral agents are contained in the liquid crystal composition, the temperature compensation range can be widened.

BRIEF DESCRIPTION OF THE DRAWINGS

These and other objects and features of the present invention will be apparent from the following description with reference to the accompanying drawings, in which:

FIG. 1 is composed of 1a and 1b which are sectional views of a liquid crystal display as the first embodiment, FIG. 1a showing the liquid crystal display in a planar state and FIG. 1b showing the liquid crystal display in a focal-conic state;

DETAILED DESCRIPTION OF THE PREFERRED EMBODIMENTS

Figure 2:
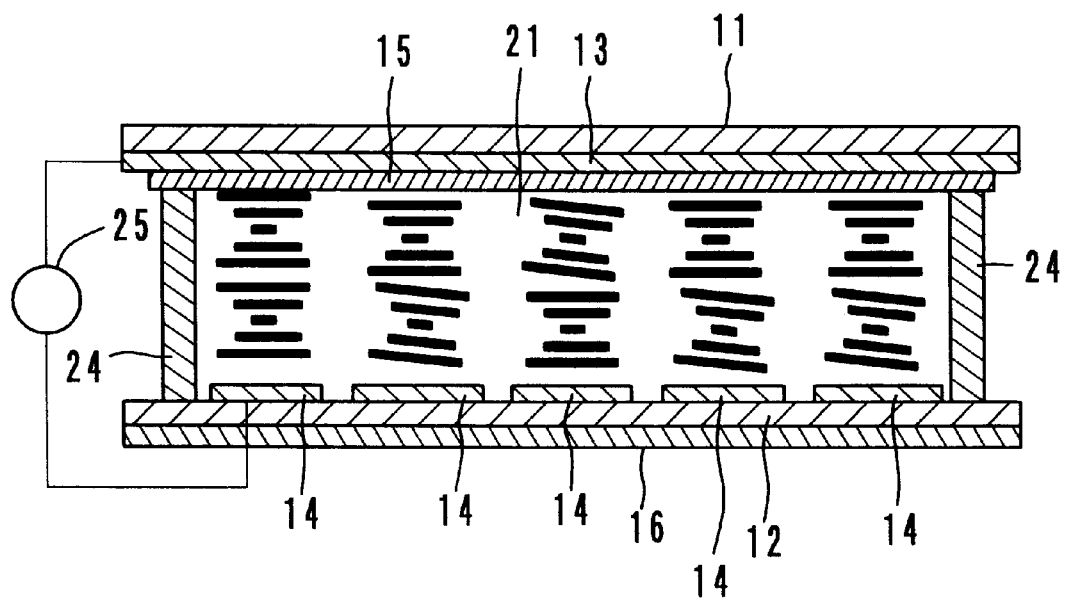
FIG. 2 is a sectional view of a liquid crystal display as the second embodiment.

Preferred embodiments of a liquid crystal composition and a liquid crystal display device according to the present invention are described with reference to the accompanying drawings.

Structure and Display Operation of the First Embodiment

FIG. 1 is a sectional view of a liquid crystal display according to the first embodiment of the present invention. FIG. 1a shows a planar state (RGB coloring state) in which a high pulse voltage is applied to the liquid crystal display, and FIG. 1b shows a focal-conic state (transparent/black display state) in which a low pulse voltage is applied to the liquid crystal display. The liquid crystal ar display has non-volatility, and the planar state and the focal-conic state are maintained even after stoppage of the application of the pulse voltage.

In FIG. 1, the numbers 11 and 12 are transparent substrates, on which transparent electrodes 13 and 14 are formed, respectively. The electrodes 13 and 14 are, respectively, in the form of strips arranged in parallel. The extending direction of the electrode strips 13 and the extending direction of the electrode strips 14 cross each other, and the electrodes 13 and 14 face each other. In other words, the electrodes 13 and 14 are arranged in a matrix. It is preferred that an insulating layer 15 is provided on the electrode strips 13. In addition, on the reverse side of the substrate 12, a visible light absorbing layer 16 is provided if necessary.

The number 20 is a columnar structure serving as a space maintaining member, and the number 21 is a liquid crystal composition which exhibits a cholesteric phase at room temperature. The materials of these members and combinations thereof will be described later and further specific descriptions will be made referring to examples. The number 24 denotes a seal which is to seal the liquid crystal composition 21 between the substrates 11 and 12. The number 25 denotes a pulse electric source that applies a pulse voltage to the electrodes 13 and 14.

In the liquid crystal display of the above structure, a display is made by application of a pulse voltage from the electric source 25 to the electrodes 13 and 14. Specifically, if the liquid crystal composition 21 is one which exhibits a cholesteric phase, when a pulse voltage with comparatively high energy is applied thereto, the liquid crystal comes to a planar state and selectively reflects light of a wavelength determined by the cholesteric pitch and the refractive index. When a pulse voltage with comparatively low energy is applied, the liquid crystal comes to a focal-conic state and becomes transparent. Further, as FIG. 1 shows, when the visible light absorbing layer 16 is provided, a black display is made in the focal-conic state.

In the liquid crystal display, the intersections of the electrode strips 13 and 14, which are arranged in a matrix, are display pixels. In the following paragraphs, the area where light modulation is carried out by the liquid crystal is referred to as display area, and the periphery of the display area is a non-display area in which light modulation is not carried out.

Substrate

At least one of the substrates 11 and 12 must be transparent. For a transparent substrate, not only glass but also flexible material such as polycarbonate, polyether sulfone, polyethylene terephthalate, etc. can be used.

Electrode

For the electrodes 13 and 14, transparent conductive films typically of ITO (indium tin oxide), metal such as aluminum, silicone, etc., photoconductive films of amorphous silicone, BSO (bismuth silicone oxide) etc. can be used. In order to form the electrodes 13 and 14 in a matrix, for example, an ITO film is formed on each of the substrates 11 and 12 by sputtering, and the ITO film is patterned by photolithography.

Insulating Layer, Alignment Controlling Layer

The insulating layer 15 is an inorganic film of e.g. silicone oxide or an organic film of e.g. polyimide resin, epoxy resin or the like. The insulating layer 15 functions as a preventive measure to inhibit a short-circuit between the electrodes 13 and 14 and as a gas barrier layer to improve the reliability of the liquid crystal. Also, alignment controlling layers, which are typically made of polyimide resin may be provided on the electrodes 13 and 14, if necessary. Further, the polymeric material which is used for the columnar structure 20 can be used for the insulating layer 15 and the alignment controlling layers.

Spacers

Although they are not shown in FIG. 1, spacers may be provided between the substrates 11 and 12. The spacers are spherical and made of resin or inorganic oxide. The spacers evenly maintain the gap between the substrates 11 and 12. It is possible to use the spherical spacers as a space maintaining member instead of the columnar structure 20.

Liquid Crystal Composition

The liquid crystal composition is a chiral nematic liquid crystal composition which contains a liquid crystal tolan compound, a liquid crystal ester compound, a liquid crystal phenylcyclohexane compound and a chiral agent, and exhibits a cholesteric phase at room temperature. Further, a dye may be added. In addition, the liquid crystal composition may contain a liquid crystal cyano biphenyl compound.

The liquid crystal ester compound preferably has a CN group, and the content of the liquid crystal ester compound is preferably not less than 50 wt %. It is also preferred that the content of the liquid crystal tolan compound and the content of the liquid crystal phenylcyclohexane compound are, respectively, not less than 10 wt % and not less than 5 wt %. Further, the content of the liquid crystal cyano biphenyl compound is preferably less than 15 wt %.

The wavelength to be selectively reflected by the liquid crystal composition can be controlled by changing the content of the chiral agent in the liquid crystal composition. In general, by increasing the content of the chiral agent, the wavelength to be reflected by the liquid crystal composition becomes shorter. The wavelength to be selectively reflected by the liquid crystal composition means the peak wavelength in the visible light wavelength range of the reflectance spectrum in the planar state of the liquid crystal realized by application of a high pulse voltage to the electrodes 13 and 14.

The following general chemical formula (A) and specific chemical formulas ($A_1$) through ($A_{84}$) show usable liquid crystal tolan compounds.

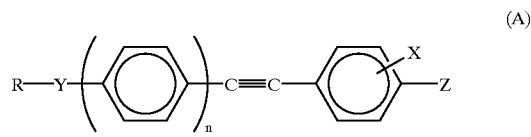

(A)

R: alkyl, alkenyl or alkoxyl with one to ten carbons
x: fluorine or hydrogen
Y: cyclohexyl, bicyclohexyl or single bond
Z: fluorine, fluoroa, cyano, or alkyl, alkenyl or alkoxyl with one to ten carbons, or the group shown by the following chemical formula

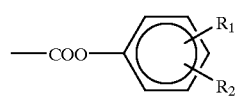

$R_1$, $R_2$: hydrogen, halogen or alkyl with one to ten carbons
n: 1 or 2

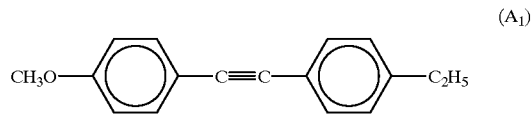

($A_1$)

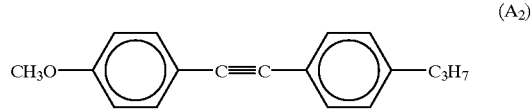

($A_2$)

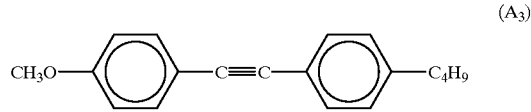

($A_3$)

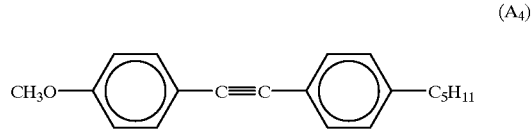

($A_4$)

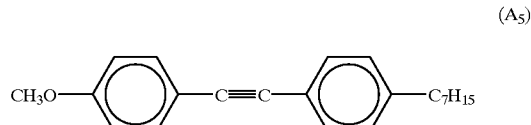

($A_5$)

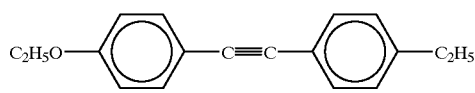
(A6)
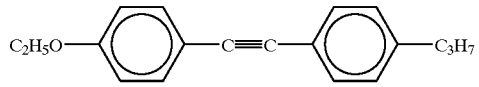
(A7)
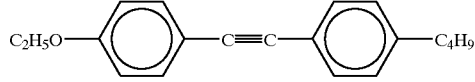
(A8)
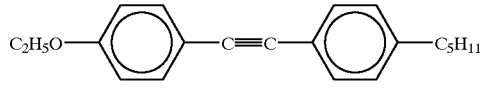
(A9)
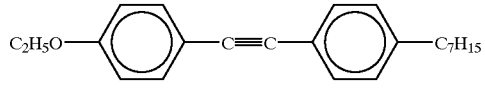
(A10)
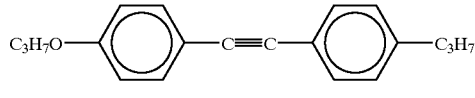
(A11)
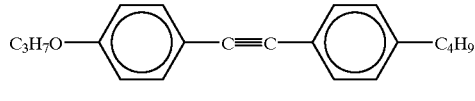
(A12)
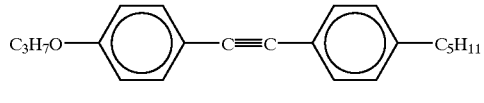
(A13)
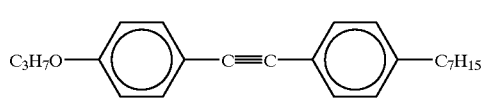
(A14)
(A15)
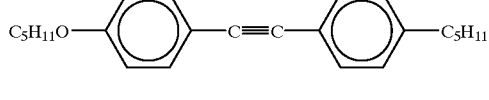
(A16)
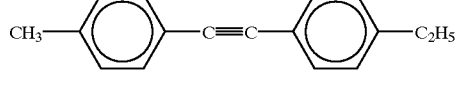
(A17)
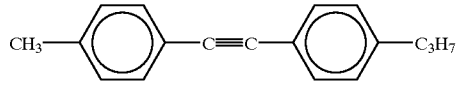
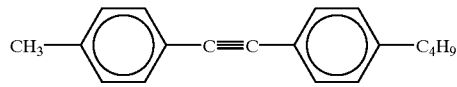
(A18)
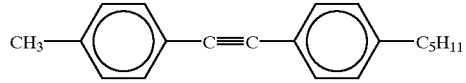
(A19)
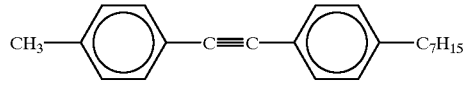
(A20)
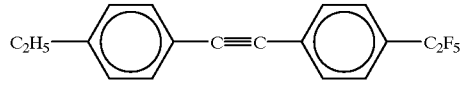
(A21)
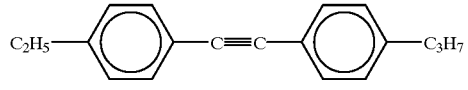
(A22)
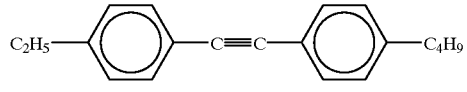
(A23)
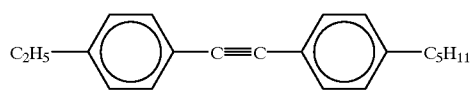
(A24)
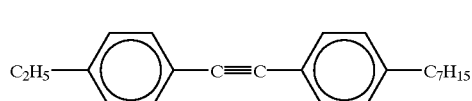
(A25)
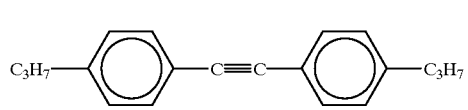
(A26)
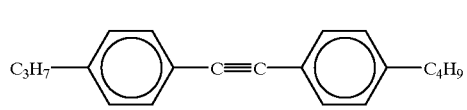
(A27)
(A28)
(A29)
(A30)

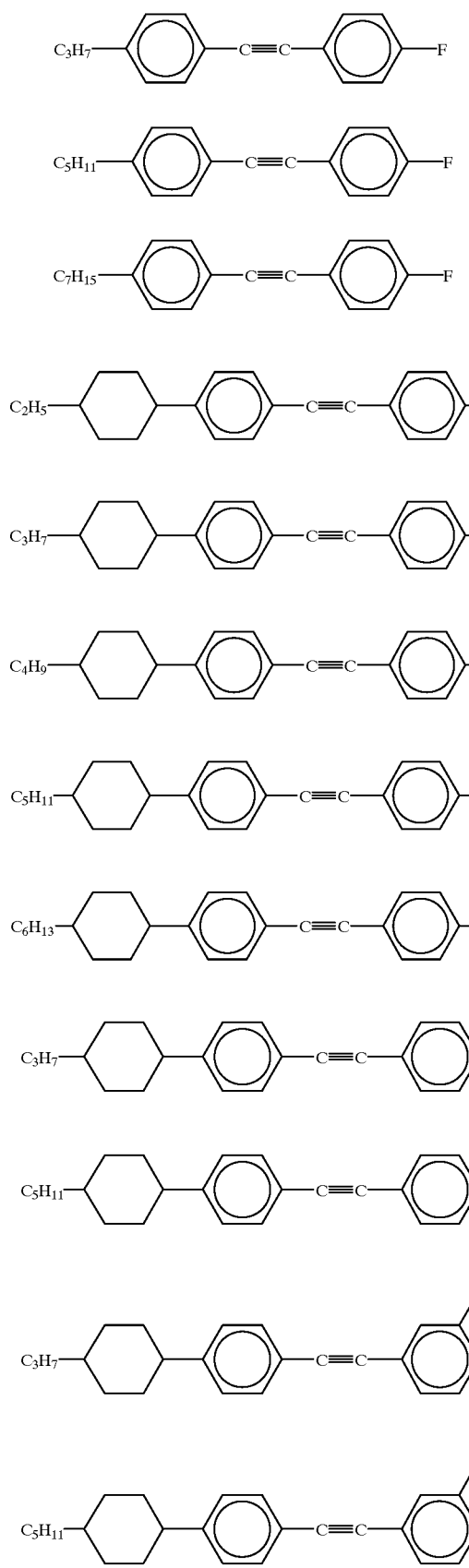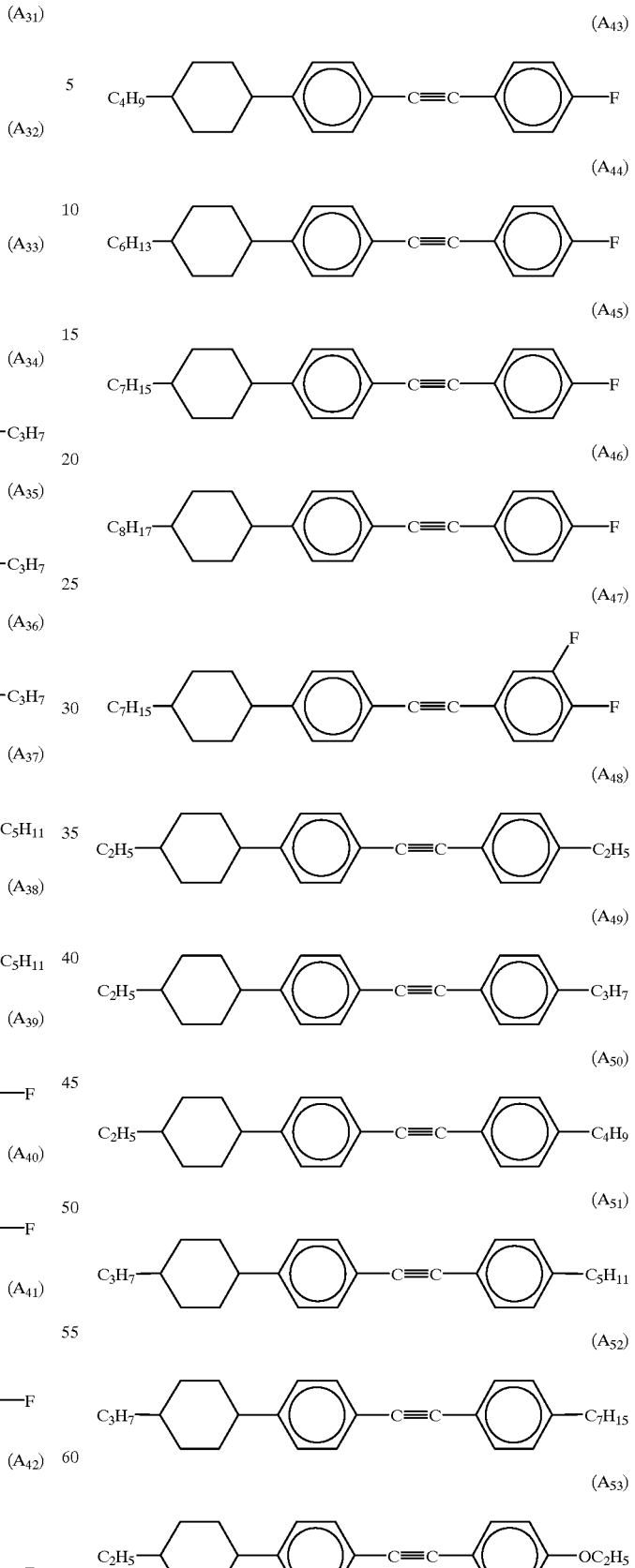

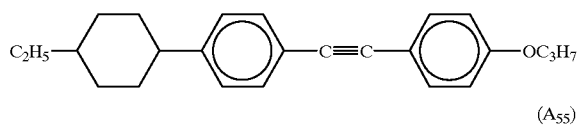
(A54)
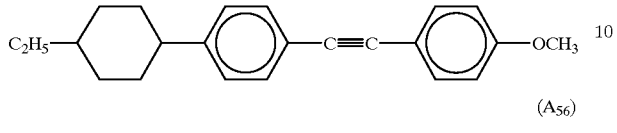
(A55)
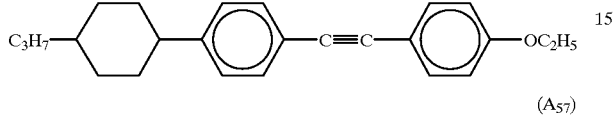
(A56)
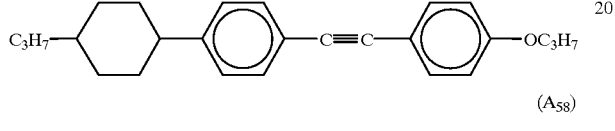
(A57)
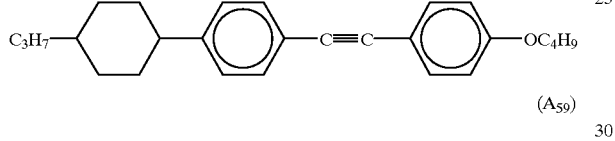
(A58)
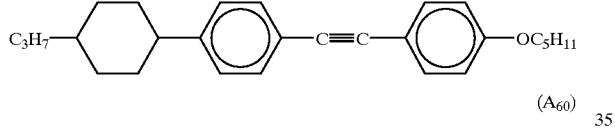
(A59)
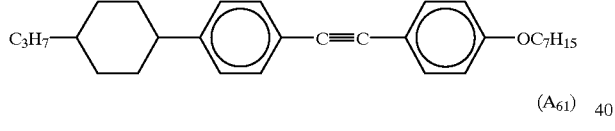
(A60)
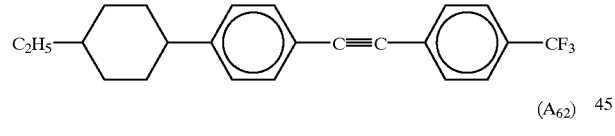
(A61)
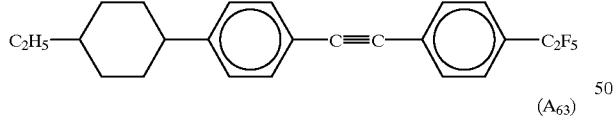
(A62)
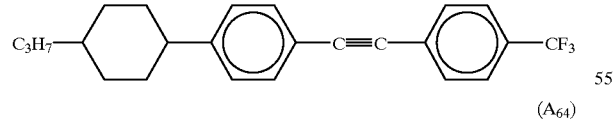
(A63)
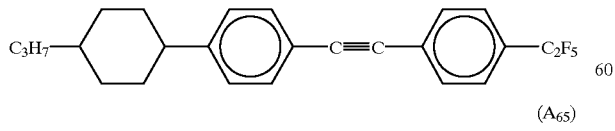
(A64)
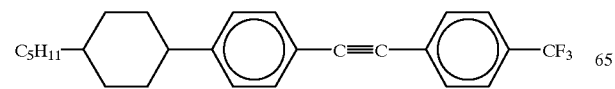
(A65)
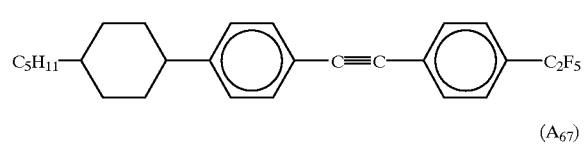
(A66)
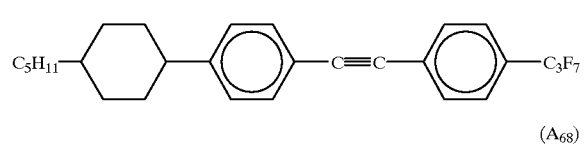
(A67)
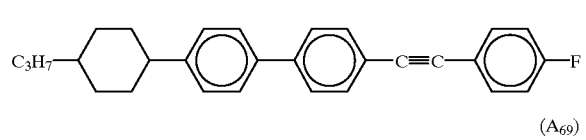
(A68)
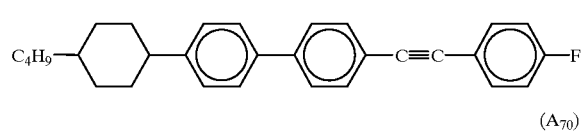
(A69)
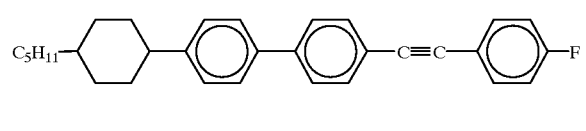
(A70)
(A71)
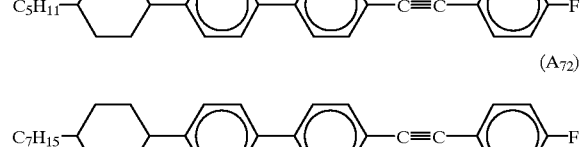
(A72)
(A73)
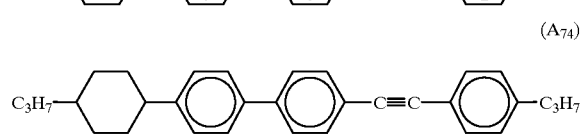
(A74)
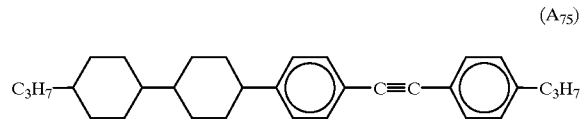
(A75)
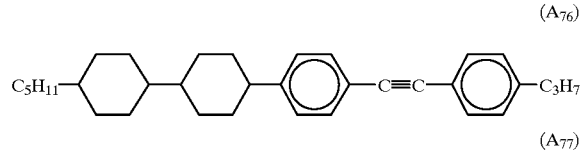
(A76)
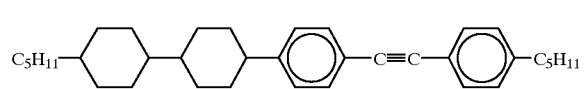
(A77)

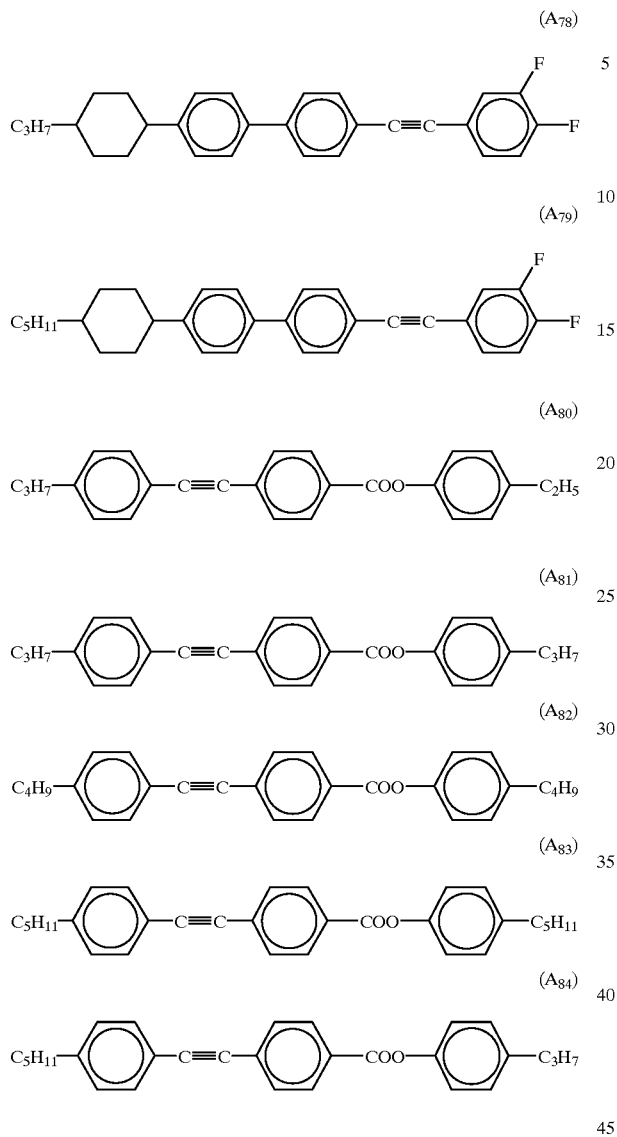
The following general chemical formula (B) and specific chemical formulas (B$_1$) through (B$_{84}$) show usable liquid crystal ester compounds.
$$R_3\text{—}A\text{—}A_{r1}\text{—}COO\text{—}A_{r2}\text{—}(R_4)_n \quad (B)$$
R$_3$, R$_4$, fluorine, fluoroal, cyano, or alkyl, alkenyl or alkoxyl with one to ten carbons
n: 1 or 2
A, Ar$_2$: phenylene or cyclohexyl
Ar$_1$: cyclohexyl, phenylene or single bond
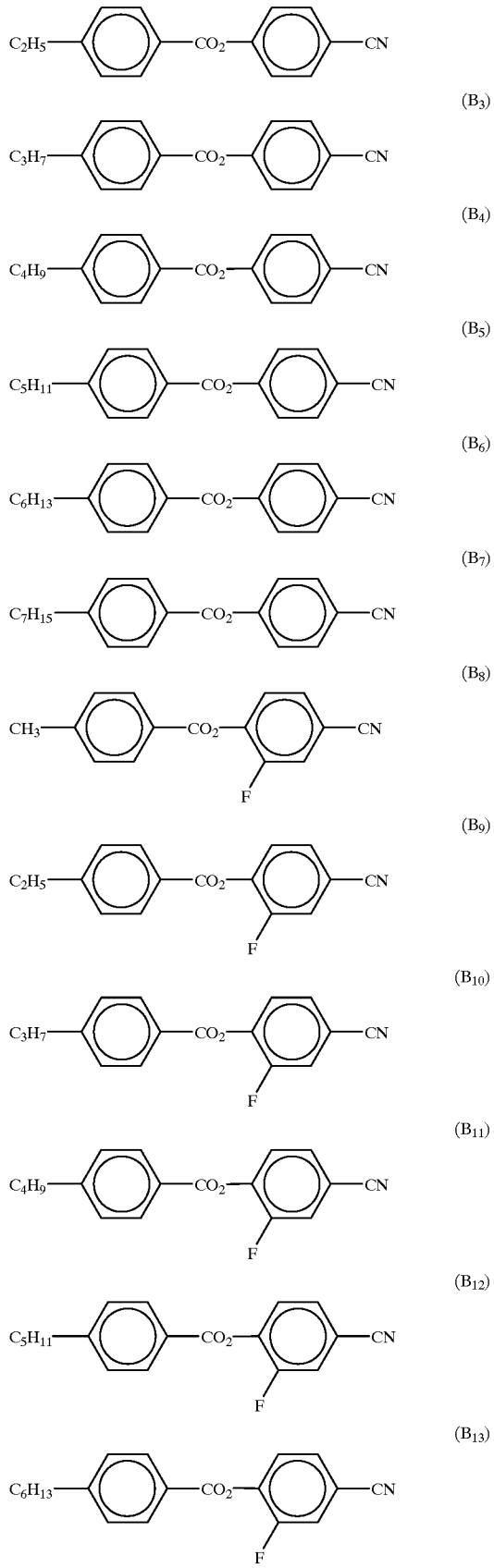

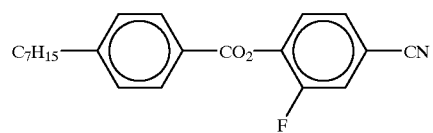 (B14)
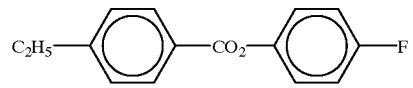 (B15)
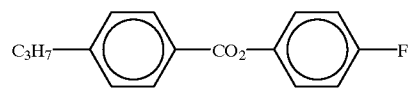 (B16)
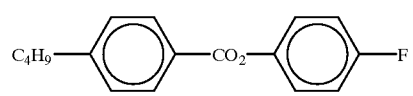 (B17)
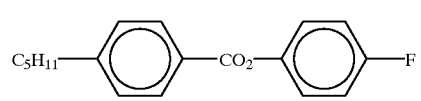 (B18)
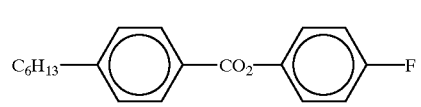 (B19)
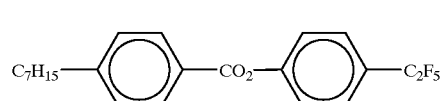 (B20)
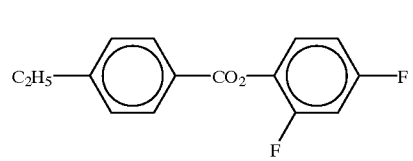 (B21)
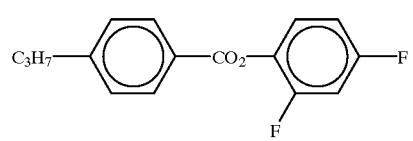 (B22)
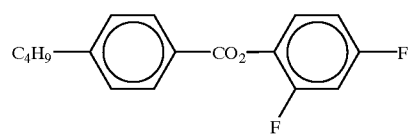 (B23)
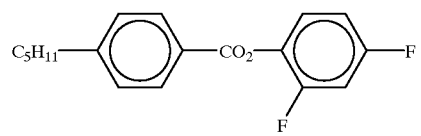 (B24)
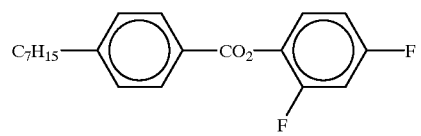 (B25)
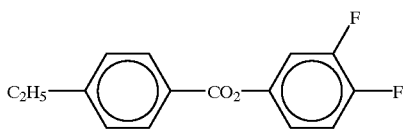 (B26)
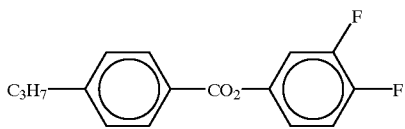 (B27)
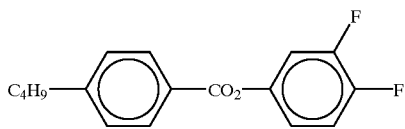 (B28)
 (B29)
 (B30)
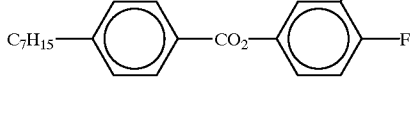 (B31)
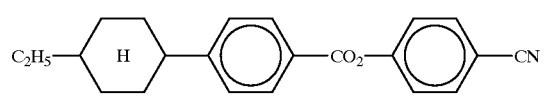 (B32)
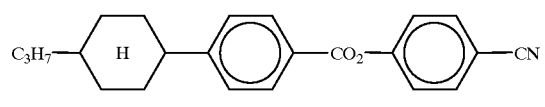 (B33)
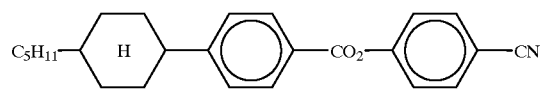 (B34)
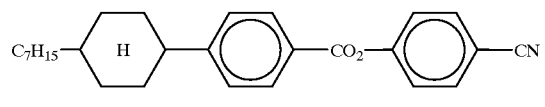 (B35)
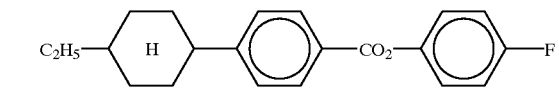 (B36)
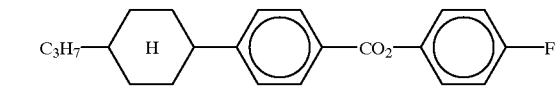

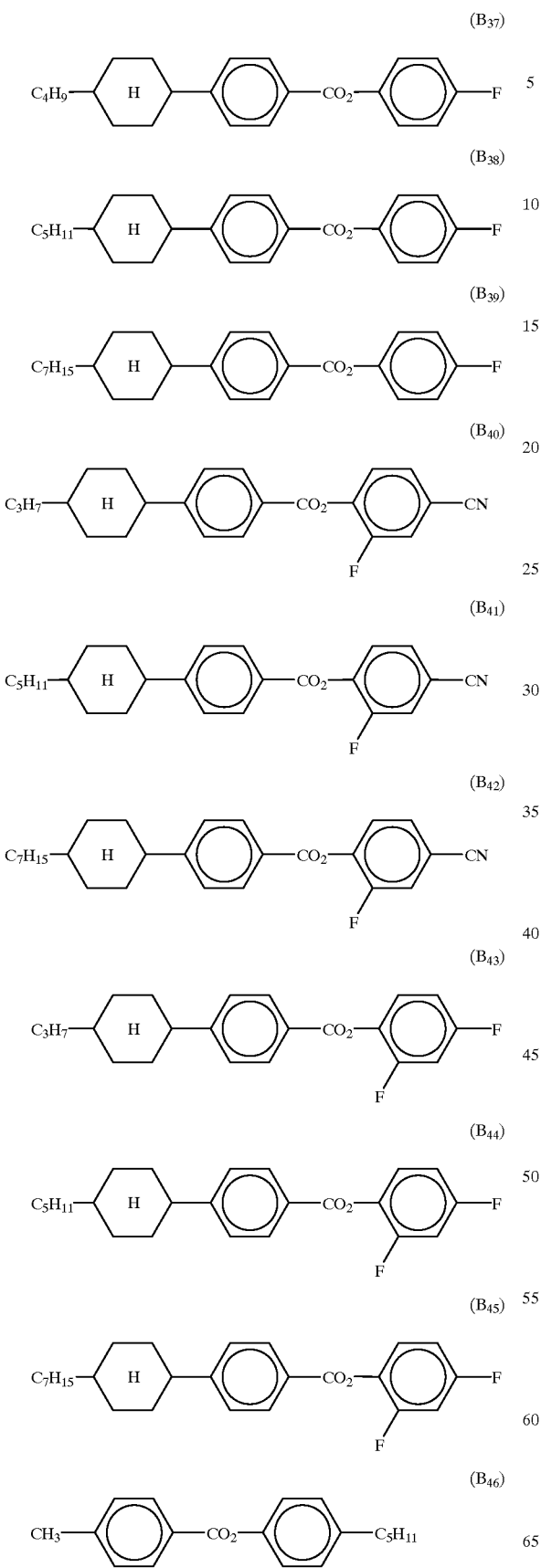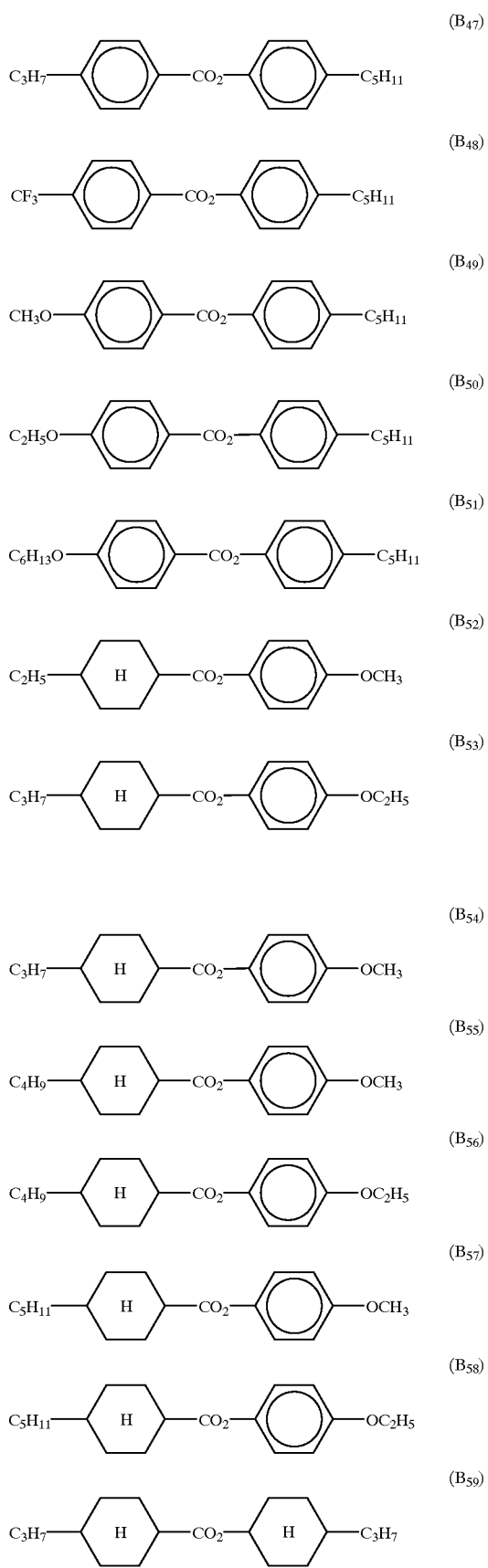

(B60) 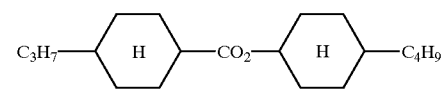
(B61) 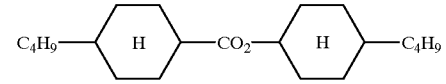
(B62) 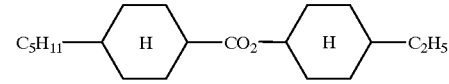
(B63) 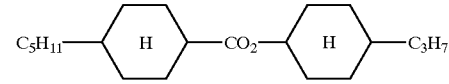
(B64) 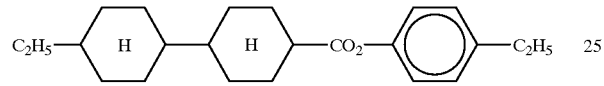
(B65) 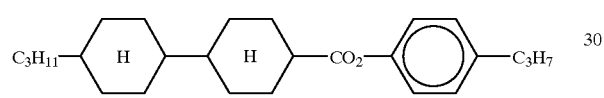
(B66) 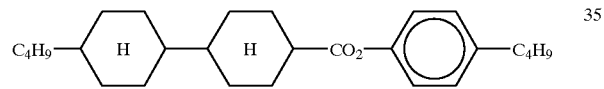
(B67) 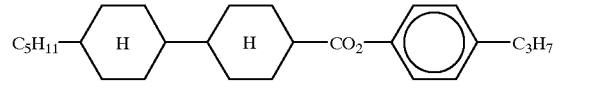
(B68) 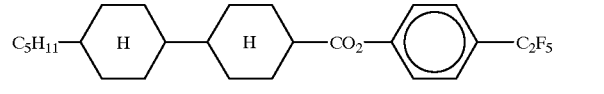
(B69) 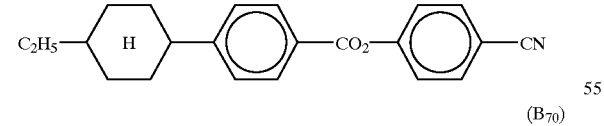
(B70) 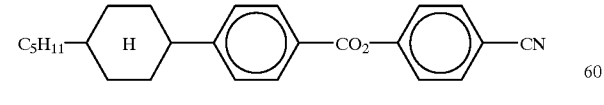
(B71) 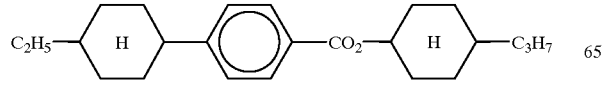
(B72) 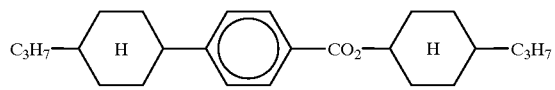
(B73) 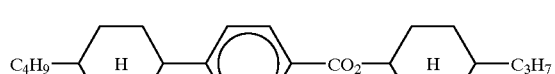
(B74) 
(B75) 
(B76) 
(B77) 
(B78) 
(B79) 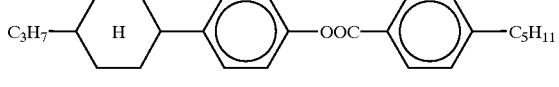
(B80) 
(B81) 
(B82) 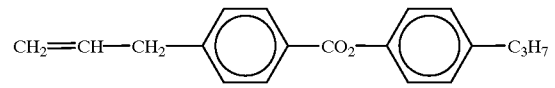

-continued

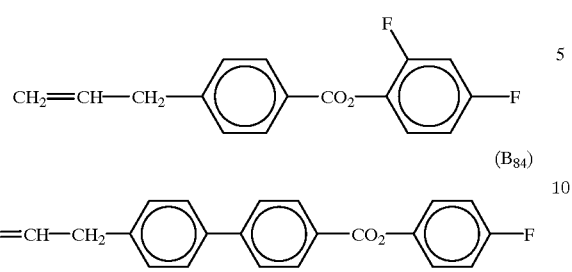
(B₈₃)

(B₈₄)

The following general chemical formula (C) and specific chemical formulas (C₁) through (C₄₈) show usable liquid crystal phenylcyclohexane compounds.

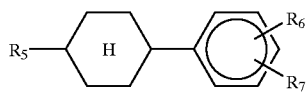
(C)

$R_5$: alkyl, alkenyl or alkoxyl with one to ten carbons
$R_6$, $R_7$: fluorine, fluoroalkyl, cyano, or alkyl, alkenyl or alkoxyl with one to ten carbons (

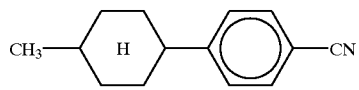 (C₁)

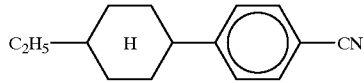 (C₂)

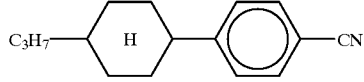 (C₃)

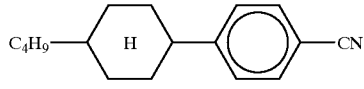 (C₄)

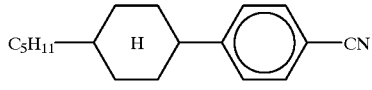 (C₅)

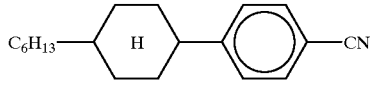 (C₆)

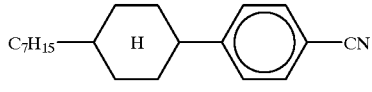 (C₇)

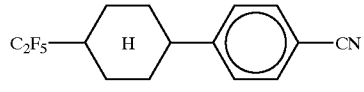 (C₈)

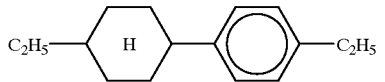 (C₉)

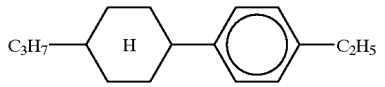 (C₁₀)

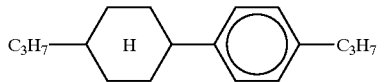 (C₁₁)

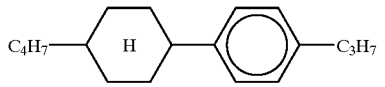 (C₁₂)

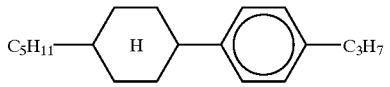 (C₁₃)

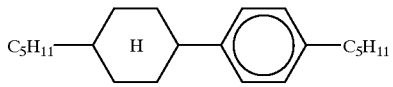 (C₁₄)

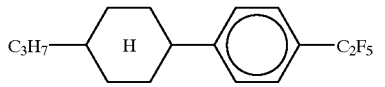 (C₁₅)

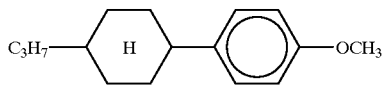 (C₁₆)

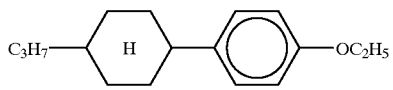 (C₁₇)

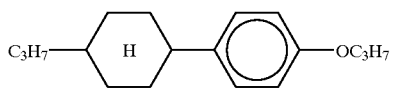 (C₁₈)

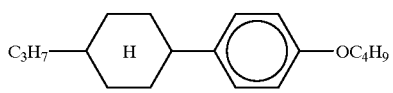 (C₁₉)

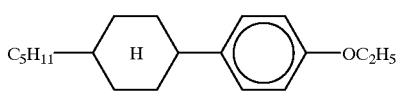 (C₂₀)

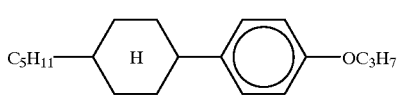 (C₂₁)

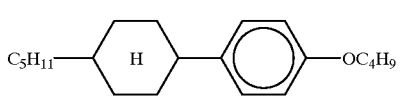 (C₂₂)

(C23) 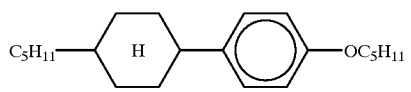
(C24) 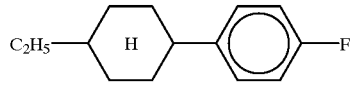
(C25) 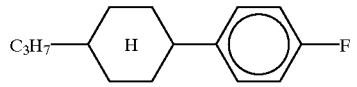
(C26) 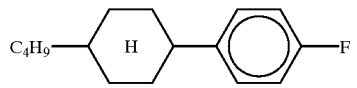
(C27) 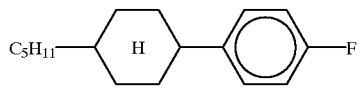
(C28) 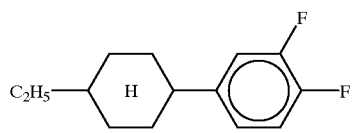
(C29) 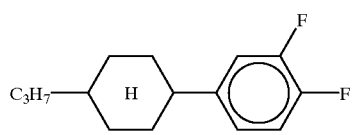
(C30) 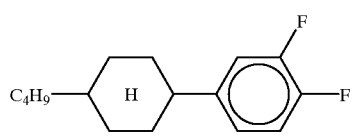
(C31) 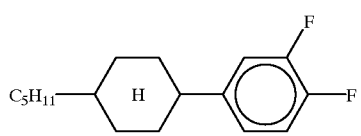
(C32) 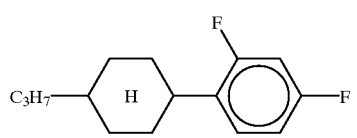
(C33) 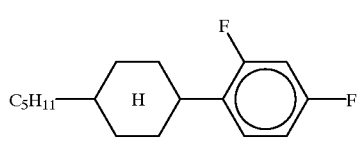
(C34) 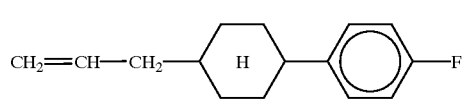
(C35) 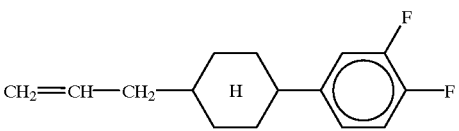
(C36) 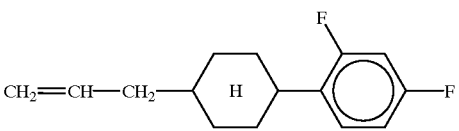
(C37) 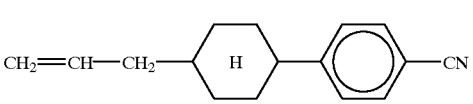
(C38) 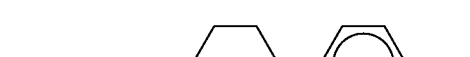
(C39) 
(C40) 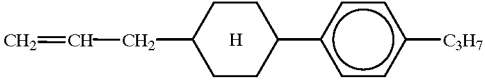
(C41) 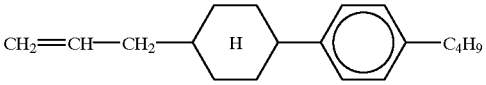
(C42) 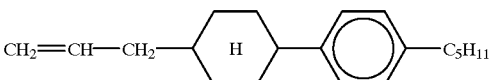
(C43) 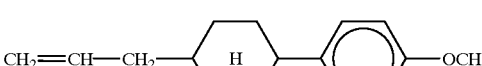
(C44) 
(C45) 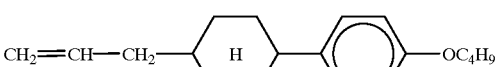

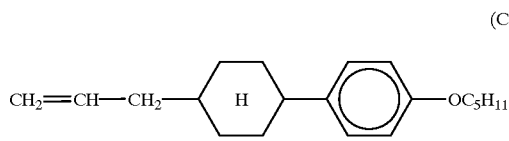

(C46)

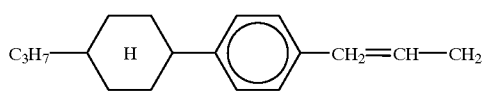

(C47)

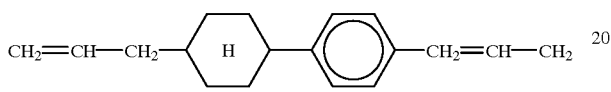

(C48)

Various well-known chiral agents, for example, ester compounds, pyrimidine compounds, azoxy compounds, tolan compounds, etc. are usable as the chiral agent in this embodiment. The compounds shown by the following chemical formulas ($D_1$) through ($D_6$) are especially suited to be used as the chiral agent. In this embodiment, at least an ester compound is used as the chiral agent, and it is preferred to use three chiral agents so as to widen the temperature compensation range. The content of the chiral agent(s) is within a range from 5 wt % to 40 wt %. If the content of the chiral agent(s) is 5 wt % or less, it may not reflect light of the desirable wavelength, and if the content of the chiral agent(s) is 40 wt % or more, the liquid crystal may not exhibit a cholesteric phase and may solidify.

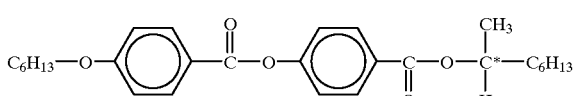

($D_1$)

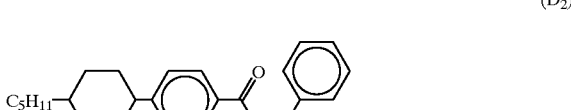

($D_2$)

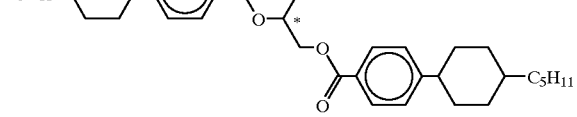

($D_3$)

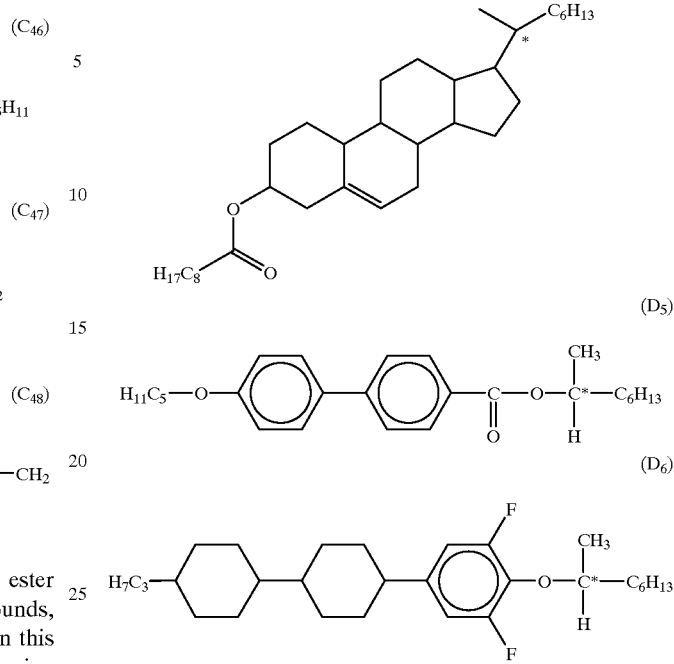

As the dye to be added, various well-known dyes, for example, azo compounds, quinon compounds, anthraquinon compounds, dichroic dyes, etc. are usable. The content of the dye is preferably not more than 3 wt %.

Columnar Structure

First, the configuration of the columnar structure 20 is described. The columnar structure 20 is composed of columns, for example, cylinders, square poles or elliptic cylinders which are arranged in a specified pattern such as a grating or stripes. Preferably, the arrangement of the columns is not random. For example, the columns may be arranged at uniform intervals, at gradually changing intervals, in periodically repeating specified patterns or the like. The arrangement is preferably such a type which enables the substrates 11 and 12 to keep a suitable gap between each other and will never be obstructive to image display. If the columnar structure 20 occupies 1% to 40% of the display area, the device can maintain sufficient strength and make satisfactory performance as a display device.

Next, the material is described. The columnar structure 20 is made of a polymeric composition which is produced by adding a polymerization initiator to polymeric monomer. The polymeric composition is, for example, photosetting resin, available in the market, that is produced by mixing photosetting monomer or oligomer with a photopolymerization initiator. A photopolymerization method in which light is radiated to photosetting resin facilitates the columnar structure 20 to be formed in a desired pattern. Materials of which main components are acrylic ester compounds are especially suited for the columnar structure 20. An acrylic ester compound is an acrylate compound or a methacrylate compound which has two or more allyl groups. It may contain an aromatic ring or the like in the main chain between the allyl groups. Also, it may contain a divalent group such as CO, $CO_2$, $CH_2$, O or the like in the main chain. Further, epoxy acrylate compounds, urethane acrylate compounds, etc. are included in acrylate compounds.

Next, the method of forming the columnar structure 20 is described.

First, an ultraviolet-ray setting compound (columnar structure composition) is filled between one of the substrates with ITO electrodes thereon and a mask with a specified pattern. Alternatively, an ultraviolet-ray setting compound is coated on the ITO electrodes on one of the substrates, and a mask is covered thereon. Then, ultraviolet rays are radiated. Next, the mask is removed, and the compound is removed from the non-radiated portions by a specified solvent. Then, the substrate is dried, so that the compound is hardened to be made into a columnar structure.

The liquid crystal composition is filled between the substrates which sandwich the columnar structure by a vacuum injection method.

The following method is also possible: a mixture of a liquid crystal material and a photosetting resin material is filled between glass substrates; while a photomask is covered on one of the substrates, light is radiated, so that the resin is polymerized and separated from the liquid crystal. Thus, the resin part is formed as the columnar structure 20.

Structure of the Second Embodiment

FIG. 2 is a sectional view of a liquid crystal display as the second embodiment of the present invention. FIG. 2 shows the planar state (when a high pulse voltage is applied) of the liquid crystal display. This liquid crystal display is basically the same as the first embodiment shown by FIG. 1. In the second embodiment, the columnar structure is not provided in the display area. In FIG. 2, the same members are provided with the same reference symbols as in FIG. 1.

Structure of the Third Embodiment

Figure 3:
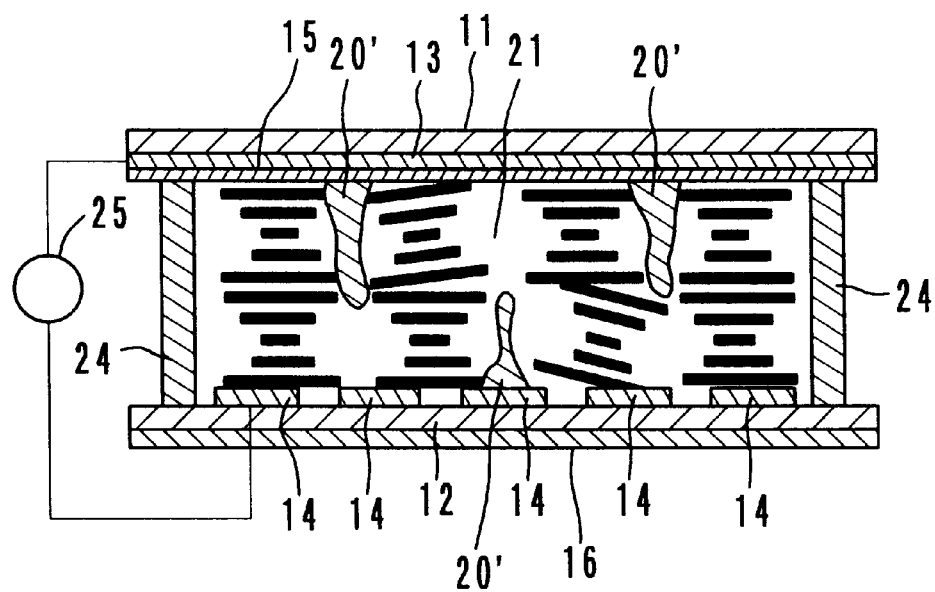
FIG. 3 is a sectional view of a liquid crystal display as the third embodiment.

FIG. 3 is a sectional view of a liquid crystal display as the third embodiment of the present invention. FIG. 3 shows the planar state (when a high pulse voltage is applied) of the liquid crystal display. In this liquid crystal display, between the substrates 11 and 12, a small columnar structure 20', of which columns extend to the middle of the gap between the substrates 11 and 12, is formed. In FIG. 3, the same members are provided with the same reference symbols as in FIG. 2.

Structure of the Fourth Embodiment

The fourth embodiment is a liquid crystal display which is of the same structure as the first embodiment. In the fourth embodiment, the columnar structure is formed by a screen printing method.

In the screen printing method, a screen with a specified pattern is covered on the electrodes on one of the substrates, and a printing material (columnar structure composition) is laid on the screen. Then, a squeegee is moved under a specified pressure, at a specified angle and at a specified speed. Thereby, the material is transferred onto the substrate through the pattern of the screen. Next, the transferred material is heated to be hardened and is dried.

In a case of forming a columnar structure in a screen printing method, the resin material is not necessarily photosetting resin, thermosetting resin such as epoxy resin, acrylic resin, etc. or thermoplastic resin can be used. As thermoplastic resin, polyvinyl chloride resin, polyvinylidene chloride resin, polyvinyl acetate resin, polyester methacrylate resin, polyester acrylate resin, polystyrene resin, polyamide resin, polyethylene resin, polypropyrene resin, fluororesin, polyurethane resin, polyacrylonitrile resin, polyvinyl ether resin, polyvinyl ketone resin, polyether resin, polyvinyl pyloridone resin, saturated polyester resin, polycarbonate resin, polyether cholorine resin, etc. can be named. It is preferred that such resin is used in a paste like state. The paste of the resin can be obtained, for example, by dissolving resin in a suitable solvent.

After the formation of the columnar structure on one of the substrates by the above-described method, spacers are dispersed on at least one of the substrates. Then, the two substrates are laid on each other with the respective sides with electrodes thereon facing each other, whereby a hollow cell is fabricated. The laminated substrates are pressed from both sides and heated, whereby the resin material of the columnar structure is softened, and thereafter, the substrates are cooled, and the resin material is hardened again.

EXPERIMENTAL EXAMPLE 1

To a nematic liquid crystal mixture which contains the liquid crystal ester compounds of the chemical formulas $(B_9)$, $(B_{10})$, $(B_{11})$, $(B_{12})$, $(B_{14})$, $(B_{65})$, $(B_{66})$ and $(B_{67})$ at 58 wt %, the liquid crystal tolan compounds of the chemical formulas $(A_1)$, $(A_6)$, $(A_{34})$, $(A_{35})$ and $(A_{37})$ at 18 wt % and the liquid crystal phenylcyclohexane compounds of the chemical formulas $(C_{16})$ and $(C_{17})$ at 10 wt %, the chiral agent of the chemical formula $(D_4)$ and the chiral agent of the chemical formula $(D_1)$ were added at 14.2 wt % and 7.8 wt %, respectively. Further, a dichroic dye SI-426 (made by Mitsui Toatsu Co., Ltd.) was added at 0.5 wt %. Thus, a chiral nematic liquid crystal composition which selectively reflects light of 680 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 90 V was applied between the electrodes for five milliseconds, the liquid crystal came to a planar state (showed red). At that time, the Y value was 5.81; the reflectance was 38.6%; and the color purity was 73%. When a pulse voltage of 40V was applied for five milliseconds, the liquid crystal came to a focal-conic state (transparent), and the Y value was 0.95. Accordingly, the contrast was 5.99.

The Y value (luminous reflectance) and the color purity (excitation purity) were measured by use of a spectrocolorimeter CM-3700d (made by Minolta Co., Ltd.) which has a white light source. In the experimental examples and comparative examples below, the same spectrocolorimeter was used.

EXPERIMENTAL EXAMPLE 2

To a nematic liquid crystal mixture which contains the liquid crystal ester compounds of the chemical formulas $(B_9)$, $(B_{10})$, $(B_{11})$, $(B_{12})$, $(B_{14})$, $(B_{65})$, $(B_{66})$ and $(B_{67})$ at 58 wt %, the liquid crystal tolan compounds of the chemical formulas $(A_1)$ and $(A_6)$ at 6 wt % and the liquid crystal phenylcyclohexane compounds of the chemical formulas $(C_{16})$ and $(C_{17})$ at 10 wt %, the chiral agent of the chemical formula ($D_4$) and the chiral agent of the chemical formula ($D_1$) were added at 12.5 wt % and 9.6 wt %, respectively. Further, a dichroic dye SI-426 (made by Mitsui Toatsu Co., Ltd.) was added at 0.5 wt %. Thus, a chiral nematic liquid crystal composition which selectively reflects light of 680 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 80V was applied between the electrodes for five milliseconds, the liquid crystal came to a planar state (showed red). At that time, the Y value was 4.34; the reflectance was 38.1%; and the color purity was 56.8%. When a pulse voltage of 40V was applied for five milliseconds, the liquid crystal came to a focal-conic state (transparent), and the Y value was 1.21. Accordingly, the contrast was 3.82.

COMPARATIVE EXAMPLE 1

To a nematic liquid crystal mixture which contains the liquid crystal tolan compounds of the chemical formulas ($A_1$), ($A_2$), ($A_3$), ($A_4$), ($A_6$) and ($A_8$) at 46 wt % and liquid crystal pyrimidine compounds shown by the following chemical formulas ($E_1$), ($E_2$), ($E_3$), ($E_4$) and ($E_5$) at 26 wt %, the chiral agent of the chemical formula ($D_4$) and the chiral agent of the chemical formula ($D_1$) were added at 14.0 wt % and 5.1 wt %, respectively. Further, a dichroic dye SI-426 (made by Mitsui Toatsu Co., Ltd.) was added at 0.5 wt %. Thus, a chiral nematic liquid crystal composition which selectively reflects light of 680 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

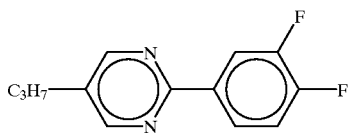
($E_1$)

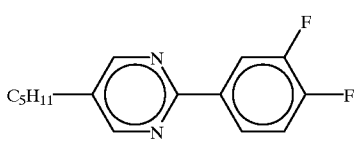
($E_2$)

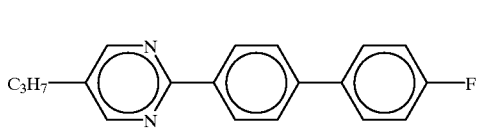
($E_3$)

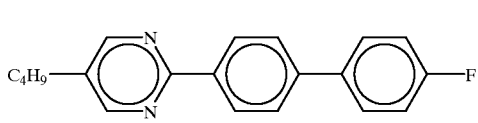
($E_4$)

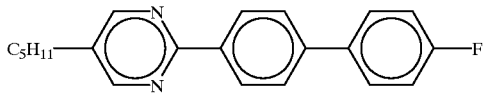
($E_5$)

In the liquid crystal display, when a pulse voltage of 100V was applied between the electrodes for five milliseconds, the liquid crystal came to a planar state (showed red). At that time, the Y value was 6.9; the reflectance was 39.1%; and the color purity was 48.97%. When a pulse voltage of 70V was applied for five milliseconds, the liquid crystal came to a focal-conic state (transparent), and the Y value was 3.36. Accordingly, the contrast was 2.05.

EXPERIMENTAL EXAMPLE 3

To a nematic liquid crystal mixture which contains the liquid crystal ester compounds of the chemical formulas ($B_{21}$), ($B_{22}$), ($B_{23}$), ($B_{24}$), ($B_{25}$), ($B_{65}$) and ($B_{67}$) at 58 wt %, the liquid crystal tolan compounds of the chemical formulas ($A_1$), ($A_2$) and ($A_6$) at 6 wt % and the liquid crystal phenylcyclohexane compounds of the chemical formulas ($C_3$), ($C_{16}$) and ($C_{17}$) at 10 wt %, the chiral agent of the chemical formula ($D_3$) and the chiral agent of the chemical formula ($D_1$) were added at 12.8 wt % and 11.5 wt %, respectively. Thus, a chiral nematic liquid crystal composition which selectively reflects light of 550 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 90V was applied between the electrodes for five milliseconds, the liquid crystal came to a planar state (showed green). At that time, the Y value was 24.62; the reflectance was 41.5%; and the color purity was 54%. When a pulse voltage of 50V was applied for five milliseconds, the liquid crystal came to a focal-conic state (transparent), and the Y value was 1.62. Accordingly, the contrast was 15.2.

EXPERIMENTAL EXAMPLE 4

To a nematic liquid crystal mixture which contains the liquid crystal ester compounds of the chemical formulas ($B_{21}$), ($B_{22}$), ($B_{23}$), ($B_{24}$), ($B_{25}$), ($B_{65}$), ($B_{66}$) and ($B_{67}$) at 52 wt %, the liquid crystal tolan compounds of the chemical formulas ($A_1$), ($A_6$), ($A_{34}$), ($A_{35}$) and ($A_{37}$) at 16 wt %, the liquid crystal phenylcyclohexane compounds of the chemical formulas ($C_{16}$) and ($C_{17}$) at 10 wt % and liquid crystal cyano biphenyl compounds shown by the following chemical formulas ($F_1$), ($F_2$) and ($F_3$) at 8 wt %, the chiral agent of the chemical formula ($D_2$) and the chiral agent of the chemical formula ($D_5$) were added at 15.2 wt % and 10.7 wt %, respectively. Thus, a chiral nematic liquid crystal composition which selectively reflects light of 550 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

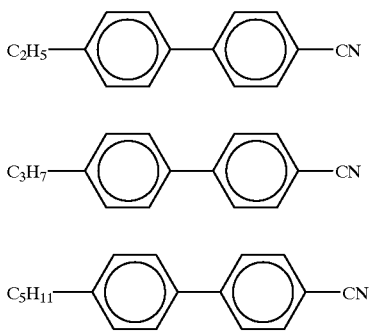

(F₁)

(F₂)

(F₃)

In the liquid crystal display, when a pulse voltage of 90V was applied between the electrodes for five milliseconds, the liquid crystal came to a planar state (showed green). At that time, the Y value was 25.53; the reflectance was 41.8%; and the color purity was 51%. When a pulse voltage of 50V was applied for five milliseconds, the liquid crystal came to a focal-conic state (transparent), and the Y value was 2.59. Accordingly, the contrast was 10.38.

EXPERIMENTAL EXAMPLE 5

To a nematic liquid crystal mixture which contains the liquid crystal ester compounds of the chemical formulas $(B_{39})$, $(B_{40})$, $(B_{41})$, $(B_{42})$, $(B_{50})$, $(B_{51})$, $(B_{52})$, $(B_{53})$, $(B_{54})$, $(B_{55})$ and $(B_{56})$ at 50 wt %, the liquid crystal tolan compounds of the chemical formulas $(A_1)$, $(A_6)$, $(A_{34})$, $(A_{35})$ and $(A_{37})$ at 15 wt %, the liquid crystal phenylcyclohexane compounds of the chemical formulas $(C_3)$, $(C_{16})$ and $(C_{17})$ at 8 wt % and the liquid crystal cyano biphenyl compounds of the chemical formulas $(F_1)$, $(F_2)$ and $(F_3)$ at 10 wt %, the chiral agent of the chemical formula $(D_3)$ and the chiral agent of the chemical formula $(D_1)$ were added at 13.5 wt % and 14.2 wt %, chemical formula $(D_1)$ were added at 13.5 wt % and 14.2 wt %, respectively. Thus, a chiral nematic liquid crystal composition which selectively reflects light of 550 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 90V was applied between the electrodes for five milliseconds, the liquid crystal came to a planar state (showed green). At that time, the Y value was 26.14; the reflectance was 40.9%; and the color purity was 53%. When a pulse voltage of 50V was applied for five milliseconds, the liquid crystal came to a focal-conic state (transparent), and the Y value was 2.05. Accordingly, the contrast was 12.75.

COMPARATIVE EXAMPLE 2

To a nematic liquid crystal mixture which contains the liquid crystal tolan compounds of the chemical formulas $(A_1)$, $(A_2)$, $(A_3)$, $(A_6)$, $(A_7)$, $(A_8)$, $(A_{34})$, $(A_{35})$ and $(A_{37})$ at 46 wt % and the liquid crystal pyrimidine compounds of the chemical formulas $(E_1)$ through $(E_5)$ and the following chemical formula $(E_6)$ at 26 wt %, the chiral agent of the chemical formula $(D_3)$ and the chiral agent of the chemical formula $(D_1)$ were added at 16.5 wt % and 11.8 wt %, respectively. Thus, a chiral nematic liquid crystal composition which selectively reflects light of 550 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

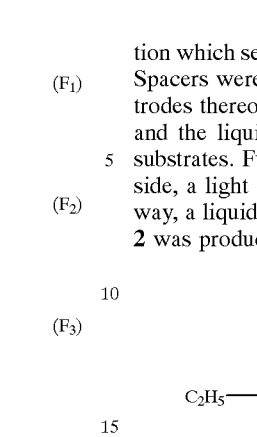

(E₆)

In the liquid crystal display, when a pulse voltage of 140V was applied between the electrodes for five milliseconds, the liquid crystal came to a planar state (showed green). At that time, the Y value was 24.3; the reflectance was 41.1%; and the color purity was 41.9%. When a pulse voltage of 90V was applied for five milliseconds, the liquid crystal came to a focal-conic state (transparent), and the Y value was 5.46. Accordingly, the contrast was 4.45.

EXPERIMENTAL EXAMPLE 6

To a nematic liquid crystal mixture which contains the liquid crystal ester compounds of the chemical formulas $(B_{21})$, $(B_{22})$, $(B_{23})$, $(B_{24})$, $(B_{38})$, $(B_{40})$, $(B_{41})$ and $(B_{42})$ at 58 wt %, the liquid crystal tolan compounds of the chemical formulas $(A_1)$, $(A_2)$ and $(A_6)$ at 6 wt %, the liquid crystal phenylcyclohexane compounds of the chemical formulas $(C_{16})$ and $(C_{17})$ at 10 wt %, the chiral agent of the chemical formula $(D_3)$, the chiral agent of the chemical formula $(D_6)$ and the chiral agent of the chemical formula $(D_1)$ were added at 12.3 wt %, 7.8 wt % and 1.8 wt %, respectively. Thus, a chiral nematic liquid crystal composition which selectively reflects light of 480 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 90V was applied between the electrodes for five milliseconds, the liquid crystal came to a planar state (showed blue). At that time, the Y value was 9.09; the reflectance was 40.4%; and the color purity was 69%. When a pulse voltage of 50V was applied for five milliseconds, the liquid crystal came to a focal-conic state (transparent), and the Y value was 0.97 Accordingly, the contrast was 9.37.

EXPERIMENTAL EXAMPLE 7

To a nematic liquid crystal mixture which contains the liquid crystal ester compounds of the chemical formulas $(B_9)$, $(B_{10})$, $(B_{11})$, $(B_{23})$, $(B_{24})$, $(B_{25})$, $(B_{65})$, $(B_{66})$ and $(B_{67})$ at 58 wt %,. the liquid crystal tolan compounds of the chemical formulas $(A_1)$, $(A_2)$, $(A_3)$ and $(A_6)$ at 6 wt %, the liquid crystal phenylcyclohexane compounds of the chemical formulas $(C_3)$, $(C_{16})$ and $(C_{17})$ at 10 wt %, the chiral agent of the chemical formula $(D_3)$, the chiral agent of the chemical formula $(D_5)$ and the chiral agent of the chemical formula $(D_1)$ were added at 13.5 wt %, 4.8 wt % and 10.8 wt %, respectively. Thus, a chiral nematic liquid crystal composition which selectively reflects light of 480 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

In the liquid crystal display, when a pulse voltage of 90V was applied between the electrodes for five milliseconds, the liquid crystal came to a planar state (showed blue). At that time, the Y value was 8.47; the reflectance was 39%; and the color purity was 68.9%. When a pulse voltage of 50V was applied for five milliseconds, the liquid crystal came to a focal-conic state (transparent), and the Y value was 1.57 Accordingly, the contrast was 5.39.

COMPARATIVE EXAMPLE 3

To a nematic liquid crystal mixture which contains the liquid crystal tolan compounds of the chemical formulas ($A_1$), ($A_2$), ($A_3$), ($A_6$), ($A_8$), ($A_{34}$), ($A_{35}$) and ($A_{37}$) at 46 wt % and the liquid crystal pyrimidine compounds of the chemical formulas ($E_3$), ($E_4$), ($E_5$) and the following chemical formulas ($E_7$) and ($E_8$) at 26 wt %, the chiral agent of the chemical formula ($D_4$) and the chiral agent of the chemical formula ($D_3$) were added at 24.0 wt % and 13.3 wt %, respectively. Thus, a chiral nematic liquid crystal composition which selectively reflects light of 550 nm was prepared. Spacers were provided between glass substrates with electrodes thereon so that the gap could be regulated to 10 μm, and the liquid crystal composition was filled between the substrates. Further, on the side opposite the light incidence side, a light absorbing layer of black was provided. In this way, a liquid crystal display of the structure shown by FIG. 2 was produced.

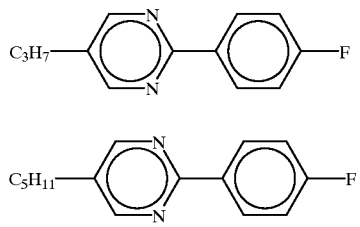

In the liquid crystal display, when a pulse voltage of 180V was applied between the electrodes for five milliseconds, the liquid crystal came to a planar state (showed green). At that time, the Y value was 11.23; the reflectance was 40.1%; and the color purity was 53.1%. When a pulse voltage of 90V was applied for five milliseconds, the liquid crystal came to a focal-conic state (transparent), and the Y value was 3.09. Accordingly, the contrast was 3.63.

Although the present invention has been described in connection with the preferred embodiments above, it is to be noted that various changes and modifications are possible to those who are skilled in the art. Such changes and modifications are to be 5understood as being within the present invention.

What is claimed is:

1. A liquid crystal composition exhibiting, as a whole, a cholesteric phase having bistability in an absence of an electric field and being capable of transforming, in response to an application of an electric field, between stable states, said stable states including a planar state and a focal-conic state, said liquid crystal composition comprising:
   a nematic liquid crystal composition comprising:
      a liquid crystal tolan compound including a tolan unit therein;
      a liquid crystal ester compound including an ester unit therein; and
      a liquid crystal phenylcyclohexane compound including a phenylcyclohexane unit therein; and
   at least one chiral agent which has optical activity;
   wherein said liquid crystal tolan compound, said liquid crystal ester compound, said liquid crystal phenylcyclohexane compound and said at least one chiral agent have mutually different chemical structures.

2. A liquid crystal composition as claimed in claim 1, wherein the liquid crystal ester compound is contained at not less than 50 weight percent of the liquid crystal composition.

3. A liquid crystal composition as claimed in claim 1, wherein the liquid crystal ester compound has a CN group.

4. A liquid crystal composition as claimed in claim 1, wherein the liquid crystal tolan compound is contained at not less than 10 weight percent of the liquid crystal composition.

5. A liquid crystal composition as claimed in claim 1, wherein the liquid crystal phenylcyclohexane compound is contained at not less than 5 weight percent of the liquid crystal composition.

6. A liquid crystal composition as claimed in claim 1, further comprising a liquid crystal cyano biphenyl compound at less than 15 weight percent of the liquid crystal composition.

7. A liquid crystal compound as claimed in claim 1, wherein a plurality of chiral agents are contained.

8. A liquid crystal display device comprising:
   a pair of substrates, at least one of which is transparent;
   a liquid crystal composition provided between the substrates, the liquid crystal composition exhibiting a cholesteric phase as a whole, comprising:
   a nematic liquid crystal composition comprising:
      a liquid crystal tolan compound including a tolan unit therein;
      a liquid crystal ester compound including an ester unit therein; and
      a liquid crystal phenylcyclohexane compound including a phenylcyclohexane unit therein;
   at least one chiral agent which has optical activity; and
   a driver for applying an electric field to the liquid crystal composition,
   wherein said liquid crystal tolan compound, said liquid crystal ester compound, said liquid crystal phenylcyclohexane compound and said chiral agent have mutually different chemical structures; and
   wherein the liquid crystal composition is bistable in an absence of an applied electrical field and is capable of transforming, in response to an application of an electric field, between stables states, said stable states including a planar state and a focal-conic state.

9. A liquid crystal display device as claimed in claim 8, wherein the liquid crystal ester compound is contained in the liquid crystal composition at not less than 50 weight percent of the liquid crystal composition.

10. A liquid crystal display device as claimed in claim 8, wherein the liquid crystal ester compound contained in the liquid crystal composition has a CN group.

11. A liquid crystal display device as claimed in claim 8, wherein the liquid crystal tolan compound is contained in the liquid crystal composition at not less than 10 weight percent of the liquid crystal composition.

12. A liquid crystal display device as claimed in claim 8, wherein the liquid crystal phenylcyclohexane compound is contained in the liquid crystal composition at not less than 5 weight percent of the liquid crystal composition.

13. A liquid crystal display device as claimed in claim 8, wherein the liquid crystal composition further contains a liquid crystal cyano biphenyl compound at less than 15 weight percent of the liquid crystal composition.

14. A liquid crystal display device as claimed in claim 8, wherein the liquid crystal composition is held by a columnar structure which is formed between the substrates.

15. A liquid crystal composition in accordance with claim 1, wherein:

the liquid crystal tolan compound has the formula:

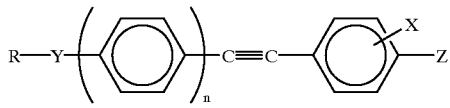

wherein
- R is an alkyl group containing from 1 to 10 carbon atoms, an alkenyl group containing from 1 to 10 carbon atoms, or an alkoxyl group containing from 1 to 10 carbon atoms;
- X is a fluorine or hydrogen;
- Y is cyclohexyl, bicyclohexyl, or a single bond;
- Z is fluorine, fluoroalkyl, cyano, an alkyl group containing from 1 to 10 carbon atoms, an alkenyl group containing from 1 to 10 carbon atoms, an alkoxyl group containing from 1 to 10 carbon atoms, or the group represented by the following formula:

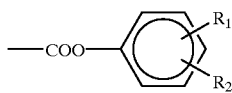

wherein $R_1$ is hydrogen, halogen or an alkyl group containing from 1 to 10 carbon atoms, and
$R_2$ is hydrogen, halogen, or an alkyl group containing from 1 to 10 carbon atoms; and
n is 1 or 2;

wherein the liquid crystal ester compound has the formula:

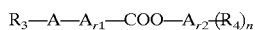

wherein
- $R_3$ is fluorine, fluoroalkyl, cyano, alkyl with 1 to 10 carbon atoms, alkenyl with 1–10 carbon atoms, or alkoxyl with 1 to 10 carbon atoms;
- $R_4$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms;
- n is 1 or 2;
- A is phenylene or cyclohexyl;
- $Ar_1$ is cyclohexyl, phenylene or a single bond; and
- $Ar_2$ is phenylene or cyclohexyl;

wherein the liquid crystal phenylcyclohexane compound has the formula:

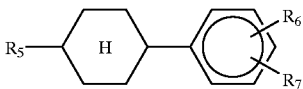

wherein:
- $R_5$ is an alkyl group containing from 1 to 10 carbon atoms, an alkenyl group containing from 1 to 10 carbon atoms, or an alkoxyl group containing from 1 to 10 carbon atoms;
- $R_6$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms; and
- $R_7$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms; and wherein each said at least one chiral agent has one of the following formulas:

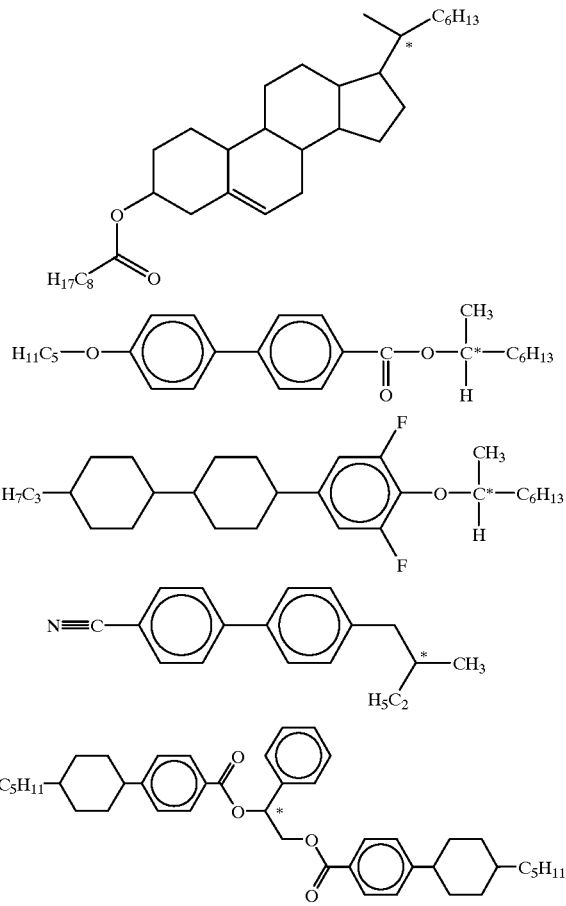

and

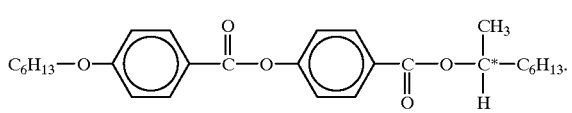

16. A liquid crystal display device in accordance with claim 8, wherein the liquid crystal tolan compound has the formula:

R—Y—(ring)ₙ—C≡C—(ring)—X, Z wherein
R is an alkyl group containing from 1 to 10 carbon atoms, an alkenyl group containing from 1 to 10 carbon atoms, or an alkoxyl group containing from 1 to 10 carbon atoms;
X is a fluorine or hydrogen;
Y is cyclohexyl, bicyclohexyl, or a single bond;
Z is fluorine, fluoroalkyl, cyano, an alkyl group containing from 1 to 10 carbon atoms, an alkenyl group containing from 1 to 10 carbon atoms, an alkoxyl group containing from 1 to 10 carbon atoms, or the group represented by the following formula:

—COO—(ring)—$R_1$, $R_2$ wherein $R_1$ is hydrogen, halogen or an alkyl group containing from 1 to 10 carbon atoms; and
$R_2$ is hydrogen, halogen, or an alkyl group containing from 1 to 10 carbon atoms; and
n is 1 or 2;
wherein the liquid crystal ester compound has the formula:

$R_3$—A—$A_{r1}$—COO—$A_{r2}$—$(R_4)_n$ wherein
$R_3$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms;
$R_4$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms;
n is 1 or 2;
A is phenylene or cyclohexyl;
$Ar_1$ is cyclohexyl, phenylene or a single bond; and
$Ar_2$ is phenylene or cyclohexyl;
wherein the liquid crystal phenylcyclohexane compound has the formula:

$R_5$—(H)—(ring)—$R_6$, $R_7$ wherein
$R_5$ is an alkyl group containing from 1 to 10 carbon atoms, an alkenyl group containing from 1 to 10 carbon atoms, or an alkoxyl group containing from 1 to 10 carbon atoms;
$R_6$ is fluorine, fluoroalkyl, cyano, an alkyl group containing from 1 to 10 carbon atoms, an alkenyl group containing from 1 to 10 carbon atoms, or an alkoxyl group containing from 1 to 10 carbon atoms; and
$R_7$ is fluorine, fluoroalkyl, cyano, an alkyl group containing from 1 to 10 carbon atoms, an alkenyl group containing from 1 to 10 carbon atoms, containing from 1 to 10 carbon atoms, or an alkoxyl group containing from 1 to 10 carbon atoms; and
wherein each said at least one chiral agent has one of the following formulas:

[structure: $C_6H_{13}$—O—(phenyl)—C(=O)—O—(phenyl)—C(=O)—O—C*H(CH₃)—$C_6H_{13}$]

[structure: N≡C—(phenyl)—(phenyl)—CH₂—C*H(CH₃)($C_2H_5$)]

[structure: $C_5H_{11}$—(cyclohexyl)—(phenyl)—C(=O)—O—C*H—CH₂—O—C(=O)—(phenyl)—(cyclohexyl)—$C_5H_{11}$]

[structure: $H_{11}C_5$—O—(phenyl)—(phenyl)—C(=O)—O—C*H(CH₃)—$C_6H_{13}$]

[structure: $H_7C_3$—(cyclohexyl)—(cyclohexyl)—(F,F-phenyl)—O—C*H(CH₃)—$C_6H_{13}$ and]

[structure: cholesterol derivative with $C_6H_{13}$ and $H_{17}C_8$—C(=O)—O— substituent]

17. A liquid crystal composition in accordance with claim 1, wherein the following conditions (1) through (3) are simultaneously satisfied:
(1) the liquid crystal tolan compound being contained in the nematic liquid crystal composition in an amount greater than or equal to 10 weight percent of the liquid crystal composition;
(2) the liquid crystal ester compound being contained in the nematic liquid crystal composition in an amount greater than or equal to 50 weight percent of the liquid crystal composition; and
(3) the liquid crystal phenylcyclohexane compound being contained in the nematic liquid crystal composition in an amount greater than or equal to 5 weight percent of the liquid crystal composition.

18. A liquid crystal display device in accordance with claim 8, wherein the following conditions (1) through (3) are simultaneously satisfied;
(1) the liquid crystal tolan compound being contained in the nematic liquid crystal composition in an amount greater than or equal to 10 weight percent of the liquid crystal composition;
(2) the liquid crystal ester compound being contained in the nematic liquid crystal composition in an amount greater than or equal to 50 weight percent of the liquid crystal composition; and (3) the liquid crystal phenylcyclohexane compound being contained in the nematic liquid crystal composition in an amount greater than or equal to 5 weight percent of the liquid crystal composition.

* * * * *